US012769322B2

(12) United States Patent
Kamata et al.

(10) Patent No.: US 12,769,322 B2
(45) Date of Patent: Oct. 20, 2026

(54) POSITIONING SYSTEM

(71) Applicant: ALPS ALPINE CO., LTD., Tokyo (JP)

(72) Inventors: Koichi Kamata, Tokyo (JP); Daisuke Takai, Tokyo (JP); Yusuke Terado, Miyagi (JP); Toshihiko Saito, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 19/249,188

(22) Filed: Jun. 25, 2025

(65) Prior Publication Data

US 2026/0056545 A1 Feb. 26, 2026

Related U.S. Application Data

(63) Continuation of application No. PCT/JP2023/038118, filed on Oct. 23, 2023.

(30) Foreign Application Priority Data

Jan. 13, 2023 (JP) ................................ 2023-003668

(51) Int. Cl.

*G05D 1/22* (2024.01)
*B64U 20/80* (2023.01)

(Continued)

(52) U.S. Cl.

CPC ............ *G05D 1/226* (2024.01); *B64U 20/80* (2023.01); *G01C 23/00* (2013.01); *G05D 1/248* (2024.01); *G05D 1/46* (2024.01); *B64U 2201/20* (2023.01)

(58) Field of Classification Search

CPC .... B64U 20/80; B64U 2201/20; G01C 21/20; G01C 23/00; G01S 13/74; G01S 19/48;

(Continued)

(56) References Cited

U.S. PATENT DOCUMENTS 6,909,902 B1 6/2005 Sawada et al.
8,041,469 B2 * 10/2011 Kellum .................. G01S 11/06 701/41

(Continued)

FOREIGN PATENT DOCUMENTS

JP 2000-341740 12/2000
JP 2003-139837 5/2003

(Continued)

OTHER PUBLICATIONS

International Search Report for PCT/JP2023/038118 mailed on Dec. 12, 2023.
Japanese Office Action for 2024-570039 mailed on Feb. 3, 2026.

*Primary Examiner* — Tyler J Lee
(74) *Attorney, Agent, or Firm* — IPUSA, PLLC

(57) ABSTRACT

A positioning system is provided with a plurality of mobile bodies for measuring positions of the plurality of mobile bodies. Each mobile body includes a positioner configured to perform positioning based on a positioning signal transmitted from a positioning satellite; a communicator configured to perform wireless communication; a distance measurer configured to measure a distance relative to another mobile body based on a propagation time or phase of a signal communicated with the communicator of the another mobile body; an angle measurer configured to calculate an angle of the mobile body of its own relative to the another mobile body based on the phase of the signal communicated with the communicator of the another mobile body; a plurality of antennas shared by the communicator, the distance measurer, and the angle measurer; and a controller configured to control the positioner, the communicator, the distance measurer, and the angle measurer.

10 Claims, 10 Drawing Sheets

(51) Int. Cl.

| | |
|---|---|
| ***G01C 23/00*** | (2006.01) |
| ***G05D 1/226*** | (2024.01) |
| ***G05D 1/24*** | (2024.01) |
| ***G05D 1/248*** | (2024.01) |
| ***G05D 1/46*** | (2024.01) |

(58) Field of Classification Search

CPC ............ G01S 5/0249; G01S 5/12; G01S 5/14; G05D 1/226; G05D 1/247; G05D 1/248; G05D 1/46; G05D 1/6983; G08G 5/26; G08G 5/55; G08G 5/57

See application file for complete search history.

(56) References Cited

U.S. PATENT DOCUMENTS

| | | | | |
|---|---|---|---|---|
| 8,229,663 | B2 * | 7/2012 | Zeng | G01S 13/726 340/995.25 |
| 8,509,731 | B2 * | 8/2013 | Kholaif | G01S 1/68 455/456.2 |
| 9,612,325 | B2 * | 4/2017 | Taylor, Jr. | G01S 13/84 |
| 2004/0008138 | A1 | 1/2004 | Hockley, Jr. et al. | |
| 2009/0005083 | A1 | 1/2009 | Hoshino et al. | |
| 2011/0111726 | A1 | 5/2011 | Kholaif et al. | |
| 2013/0045759 | A1 | 2/2013 | Smith | |
| 2016/0341557 | A1 | 11/2016 | Kondo et al. | |
| 2021/0235285 | A1 | 7/2021 | Guerena et al. | |
| 2022/0248310 | A1 | 8/2022 | Yamada et al. | |
| 2024/0192345 | A1 | 6/2024 | Nakano et al. | |

FOREIGN PATENT DOCUMENTS

| | | |
|---|---|---|
| JP | 2006-186599 | 7/2006 |
| JP | 2009-010638 | 1/2009 |
| JP | 2009-528546 | 8/2009 |
| JP | 2009-257763 | 11/2009 |
| JP | 2014-529947 | 11/2014 |
| JP | 2021-029053 | 2/2021 |
| WO | 2015/115405 | 8/2015 |
| WO | 2021/079699 | 4/2021 |
| WO | 2022/244369 | 11/2022 |

* cited by examiner

POSITIONING SYSTEM

CROSS-REFERENCE TO RELATED APPLICATIONS

This application is a continuation application of International Application No. PCT/JP2023/038118, filed on Oct. 23, 2023, and designated the U.S., which is based upon and claims priority to Japanese Patent Application No. 2023-003668, filed on Jan. 13, 2023, the entire contents of which are incorporated herein by reference.

BACKGROUND

1. Field of the Invention

The present disclosure relates to a positioning system.

2. Description of the Related Art

Conventionally, a communication apparatus has been provided with: a transmitter and receiver configured to transmit and receive information by short-range wireless communication; an obtainer configured to obtain positional information of another communication apparatus including positional information of the other communication apparatus transmitted from the other communication apparatus by using the transmitter and receiver and the positional information of own apparatus; and an information generator configured to generate composite positional information including the positional information of the own apparatus and relative positional information of the other communication apparatus with respect to the own apparatus based on the positional information of the own apparatus and the positional information transmitted from the other apparatus obtained by the obtainer, and transmit the generated composite positional information to the outside by using the transmitter and receiver (See, for example, Japanese Laid-Open Patent Application No. 2021-029053).

SUMMARY

The positioning system according to an embodiment of the present disclosure includes a plurality of mobile bodies, for measuring positions of the plurality of mobile bodies. Each mobile body includes a positioner configured to perform positioning based on a positioning signal transmitted from a positioning satellite; a communicator configured to perform wireless communication; a distance measurer configured to measure a distance relative to another mobile body based on a propagation time or phase of a signal communicated with the communicator of the another mobile body; an angle measurer configured to calculate an angle of the mobile body of its own relative to the another mobile body based on the phase of the signal communicated with the communicator of the another mobile body; a plurality of antennas shared by the communicator, the distance measurer, and the angle measurer; and a controller configured to control the positioner, the communicator, the distance measurer, and the angle measurer. The controller of the mobile body in which the positioner is unable to receive the positioning signal switches a mode to a first mode for transmitting a request signal. The controller of the mobile body in which the positioner has received the positioning signal switches the mode to a second mode to wait for reception of the request signal from the another mobile body which is unable to receive the positioning signal. When the positioner is unable to receive the positioning signal, the distance measurer transmits the request signal by using the communicator, the distance measurer measures the distance, and the angle measurer calculates the angle, upon receiving a response signal from the another mobile body in which the communicator has received the positioning signal. Positional information is obtained by adding the distance and the angle to the positional information indicated by the positioning signal received via the communicator from the mobile body which has received the positioning signal.

DETAILED DESCRIPTION OF THE PRESENT DISCLOSURE

Conventional communication apparatuses do not have a countermeasure for the case where positional information of their own apparatuses cannot be obtained from the global positioning system (GPS) or the like.

Therefore, the present disclosure provides a positioning system configured to obtain positional information of a mobile body which cannot obtain a positioning signal from a positioning satellite.

An embodiment of the positioning system of the present disclosure will be described in the following.

EMBODIMENT

<Usage of Positioning System 10>

Figure 1:
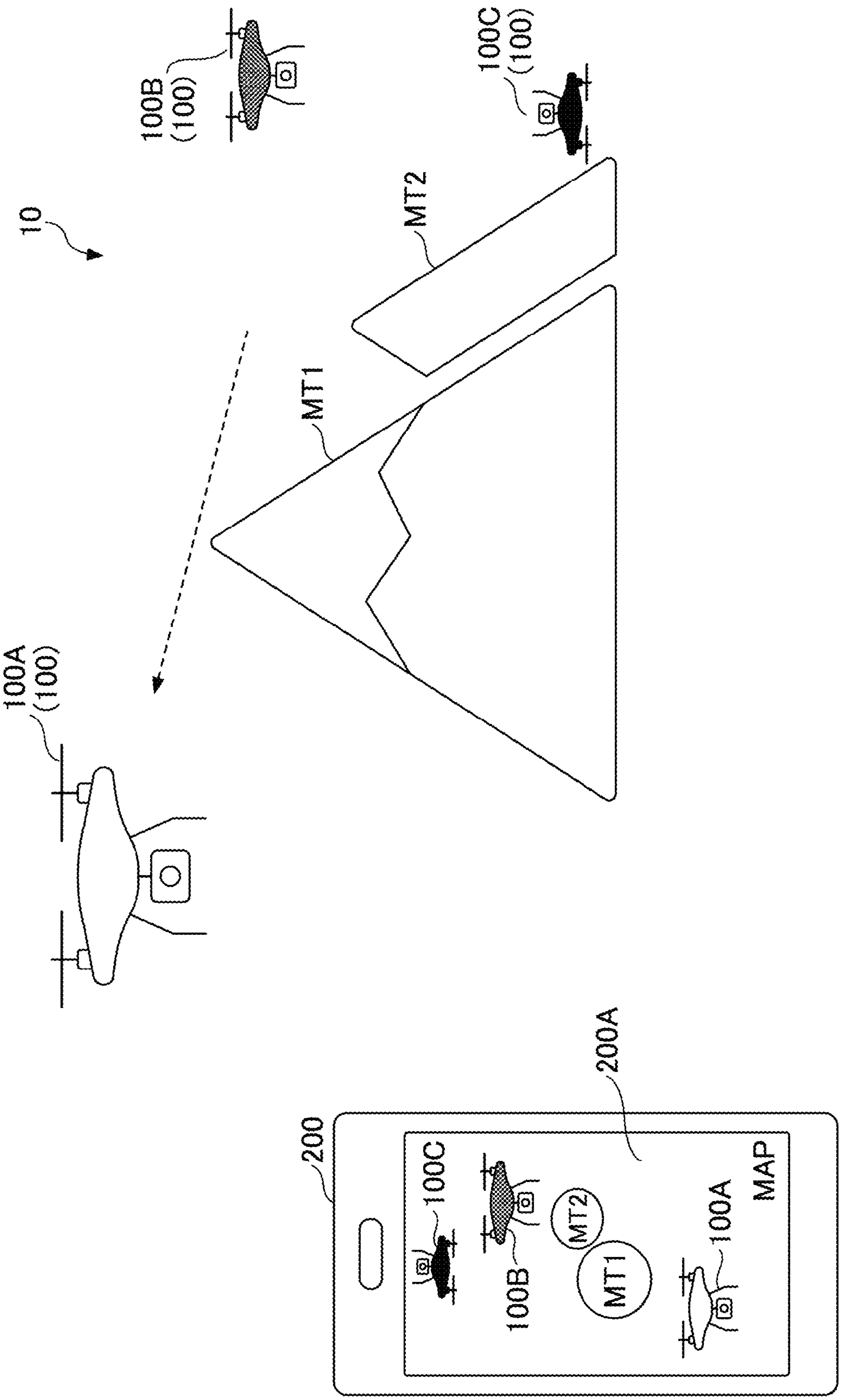
FIG. 1 is a diagram illustrating an example of usage of a positioning system.

FIG. 1 is a diagram illustrating an example of usage of a positioning system 10. The positioning system 10 includes a plurality of drones 100. The drone 100 is an example of a mobile body remotely operated by wireless communication, and is an unmanned aerial vehicle (UAV).

Here, an example of the mobile body remotely operated by wireless communication is the drone 100 capable of flying in the air. However, the positioning system 10 may include a plurality of vehicles or the like remotely operated by wireless communication instead of the drone 100. The mobile body is preferably a mobile body remotely operated by wireless communication, and more preferably a flying body. This is because the effect of obtaining positional information by the positioning system 10 is more pronounced.

In FIG. 1, three drones 100A, 100B, and 100C are illustrated. The drones 100A to 100C have the same configuration. In the following, when the drones 100A to 100C are not specifically distinguished, they are simply referred to as the drone 100.

In FIG. 1, a smartphone 200, a mountain MT1, and a mountain MT2 are illustrated. As seen from a user of the smartphone 200, the mountain MT2 is located behind the mountain MT1. A drone 100A is located in front of the mountain MT1 when viewed from the user of the smartphone 200, and a drone 100B is located behind the mountain MT2. A drone 100C is located further than the drone 100B when viewed from the user of the smartphone 200.

As an example, the drones 100A to 100C can communicate wirelessly by Bluetooth Low Energy (registered trademark) (hereinafter abbreviated as BLE). Since a communication distance of the BLE is limited, as an example, the smartphone 200 can communicate with the drone 100A by the BLE, but cannot directly communicate with the drones 100B and 100C by the BLE.

The drone 100A can communicate with the drone 100B by the BLE, but cannot directly communicate with the drone 100C by the BLE. The drone 100B can communicate with the drone 100C by the BLE.

In such a state, the drone 100C transmits the positional information of itself to the drone 100B, and the drone 100B transmits the positional information of itself and the drone 100C to the drone 100A. The drone 100A transmits the positional information of itself and drones 100B and 100C to the smartphone 200.

In this way, the positions of the mountains MT1 and MT2 and the drones 100A to 100C are displayed on a map displayed on a monitor 200A of the smartphone 200. The operator of the drones 100A to 100C may be the user of the smartphone 200 or a person other than the user of the smartphone 200.

<Configuration of Drone 100>

Figure 2:
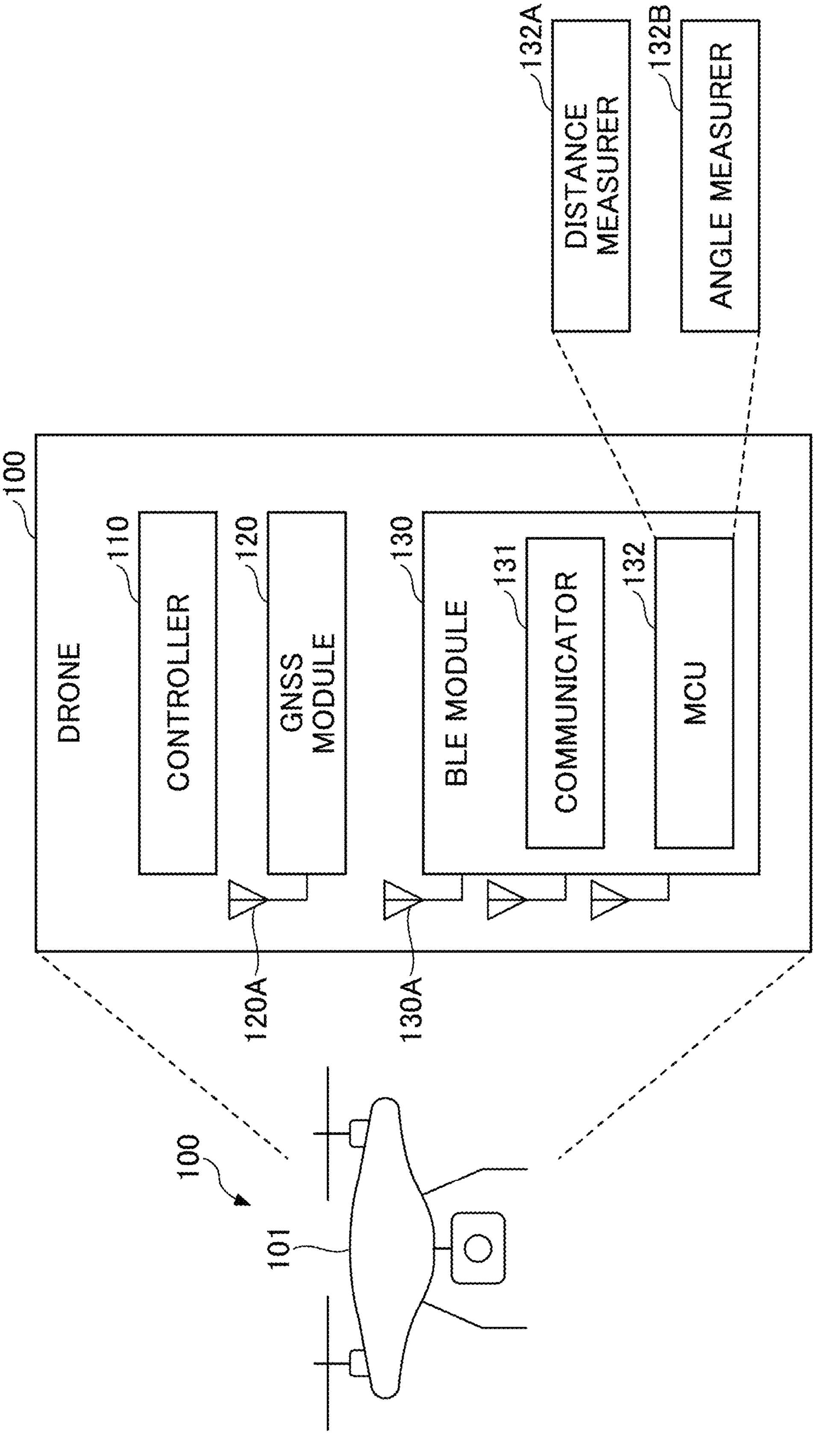
FIG. 2 is a diagram illustrating an example of a configuration of a drone.

FIG. 2 is a diagram illustrating an example of the configuration of the drone 100. The drone 100 includes a drone body 101, a controller 110, a global navigation satellite system (GNSS) module 120, and a BLE module 130. The GNSS module 120 is an example of the positioner.

The drone body 101 is the main body of the drone capable of flight, but it may include a barometric pressure sensor or the like configured to detect altitude, and may also include a camera. The drone 100 may, for example, take still pictures (photos) or moving pictures (videos) by operating the camera based on a photographing signal transmitted from a remote controller.

Here, the controller 110, the GNSS module 120, and the BLE module 130 are illustrated simplified, but the controller 110 is connected to the GNSS module 120 and the BLE module 130 through a bus or the like to enable data communication.

The controller 110 is a controller configured to integrally control the drone 100, and as an example, it includes a micro controller unit (MCU). The MCU is implemented by a computer including, for example, a central processing unit (CPU), random access memory (RAM), read only memory (ROM), an input/output interface, and an internal bus. Specifically, the controller 110 controls the GNSS module 120 and the BLE module 130. More specifically, the controller 110 controls the GNSS module 120 and a communicator 131, a distance measurer 132A, and an angle measurer 132B of the BLE module 130.

The GNSS module 120 includes an antenna 120A, and is configured to perform positioning based on the positioning signals transmitted from the positioning satellite, and outputs positional data indicating longitude and latitude representing a position of the drone 100 to the controller 110. The positioning satellite is, for example, a global positioning system (GPS) satellite, and the positioning signal is, for example, a GPS signal. When the longitude and latitude indicated by the positional data are zero, it indicates that the GNSS module 120 could not perform positioning.

The BLE module 130 includes a plurality of antennas 130A, the communicator 131, and an MCU 132. The plurality of antennas 130A is an example of the plurality of antennas shared by the communicator 131, the distance measurer 132A, and the angle measurer 132B. The number of plurality of antennas 130A may be three or more. The BLE module 130 may include three or more antennas 130A in order to perform distance measurement and angle measurement in time of arrival (TOA) and angle of arrival (AOA) formats.

Here, a configuration in which the BLE module 130 includes three antennas 130A will be described. As for the three antennas 130A, in a plane connecting the centroids of the three antennas 130A, it is sufficient as long as two of the three antennas are positioned on a first axis, and the remaining one antenna and one of the two antennas positioned on the first axis are positioned on a second axis orthogonal to the first axis.

The communicator 131 performs communication by utilizing one of the three antennas 130A. The communicator 131 can transmit and receive a BLE advertisement packet. More specifically, the BLE advertisement packet is an extended advertisement packet, as an example. The communicator 131 transmits a remote identification (RID) signal including positional information of its own drone 100, and receives a RID signal including positional information from another drone 100. The RID signal is a signal including an identifier (ID) of the drone 100, and can be stored and transmitted in an advertisement packet.

In addition, the communicator 131 can transmit and receive a signal different from that in the advertisement packet at the time of communication (ranging) for distance measurement and angle measurement. Such a signal is, for example, a modulation signal for general frequency shift keying (GenFSK). The modulation signal for GenFSK is an example of a signal other than an advertisement packet transmitted and received by the communicator 131. The frequency of the modulation signal for GenFSK is equivalent to the frequency of the advertisement packet. The communicator 131 also transmits an advertisement packet containing data such as the phase when a signal for ranging is received.

As an example, the MCU 132 is achieved by a computer including the CPU, RAM, ROM, input/output interface, internal bus, etc. The MCU 132 includes the distance measurer 132A and the angle measurer 132B. The distance measurer 132A and the angle measurer 132B represent the functions of the MCU 132 as functional blocks. The distance measurer 132A performs distance measurement processing and the angle measurer 132B performs angle measurement processing, to determine the distance and angles (elevation angle and azimuth angle) of the drone 100 with respect to another drone 100 with which the drone 100 can perform the BLE communication.

The distance measurer 132A measures the distance between its own drone 100 and the other drone 100 based on the propagation time or phase of signals communicated between the communicator 131 of its own drone 100 and the communicator 131 of the other drone 100. The other drone 100 is the drone 100 that is capable of performing BLE communication with the drone 100 of the distance measurer 132A and that has sent a ranging request, which will be described in the following, to the drone 100 of the distance measurer 132A. The distance measurer 132A measures the distance in the TOA format by using one of the three antennas 130A of the BLE module 130 of its own drone 100.

As an example, the distance measurer 132A transmits signals of a plurality of frequencies f1 to fN (N is an integer of 2 or greater) from the antenna 130A to the communicator 131 of the other drone 100 through the communicator 131 of its own drone 100, and receives signals of the plurality of frequencies f1 to fN by the antenna 130A of its own drone 100. The distance measurer 132A obtains data representing the phase when the communicator 131 of the other drone 100 receives the signal of each frequency from the communicator 131 of the other drone 100 through communication.

The distance measurer 132A determines a total phase (round-trip phase) for each frequency of the phase when the antenna 130A receives the signal of each frequency from the communicator 131 of its own drone 100 and the phase when the communicator 131 of the other drone 100 receives the signal of each frequency. The distance measurer 132A measures the distance between the antenna 130A of its own drone 100 and the other drone 100 from the relationship between the plurality of frequencies and the round-trip phase at each frequency.

Instead of the above-described distance measurement method, the distance measurer 132A may measure the distance between its own drone 100 and the other drone 100 as follows. The distance measurer 132A measures the propagation time of the signal when the signal is transmitted from the antenna 130A to the communicator 131 of the other drone 100, or the propagation time of the signal when the signal is transmitted from the communicator 131 of the other drone 100 to the antenna 130A of the own drone 100. The distance measurer 132A may measure the distance between the antenna 130A of the own drone 100 and the other drone 100 by multiplying the measured propagation time by the speed of light. The details of processing performed by the distance measurer 132A will be described in the following with reference to FIGS. 5, 7, 8A, and 8B.

The angle measurer 132B uses the three antennas 130A of the own drone 100 to measure the elevation angle and azimuth angle in the polar coordinate system of the position of the own drone 100 relative to the other drone 100 in the AOA format. The angle measurer 132B measures the elevation angle and azimuth angle in the AOA format based on phase differences when the three antennas 130A receive the signal transmitted from the other drone 100. The phase differences when the three antennas 130A receive the signal is a first phase difference when the two antennas 130A located on the first axis receive the signal, and a second phase difference when the two antennas 130A located on the second axis receive the signal. The angle measurer 132B calculates the azimuth angle representing the position of the other drone 100 relative to the own drone 100 from a ratio of the first phase difference and the second phase difference. The angle measurer 132B calculates the elevation angle representing the position of the other drone 100 relative to the own drone 100 based on the azimuth angle and the first or second phase difference. In the angle measurement processing of the AOA format, the elevation angle and the azimuth angle in the polar coordinate system of the position of the other drone 100 relative to the own drone 100 can be measured. The polar coordinate system is a coordinate system with respect to a reference point on the ground, and thus, the position is uniquely determined by a distance and an angle.

The MCU 132 includes an internal memory to store programs executed by the MCU 132 for processing, data necessary for the processing, and the like.

<Sharing Positional Information Among a Plurality of Drones 100A to 100D>

Figure 3:
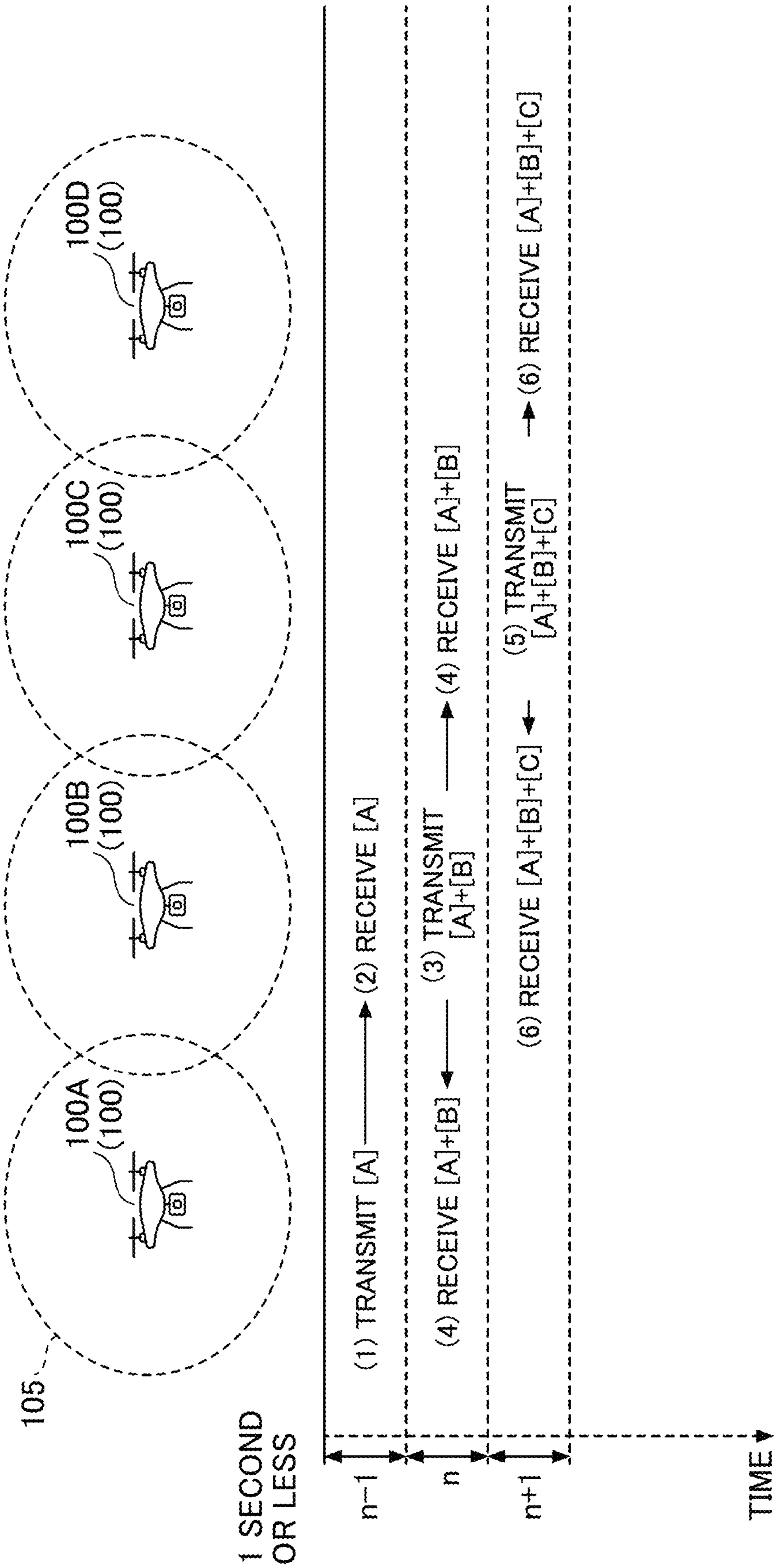
FIG. 3 is a diagram illustrating an example of how positional information is shared by a plurality of drones.

FIG. 3 is a diagram illustrating an example of how positional information is shared by a plurality of drones 100A to 100D. In FIG. 3, the four drones 100A to 100D are illustrated. All of the drones 100A to 100D have the same configuration as the drone 100 as illustrated in FIG. 2.

The drones 100A to 100D have a BLE communicable range 105. In FIG. 3, the drones 100A to 100D are arranged linearly to simplify the explanation. The drones 100A to 100D are located at positions where the communicable ranges 105 of the adjacent drones 100 include overlapping ranges.

Below the drones 100A to 100D, positional information is represented by letters [A] to [D]. The positional information [A] is the positional information obtained by the drone 100A by positioning of its own GNSS module 120, or the positional information obtained by its own MCU 132 when the GNSS module 120 cannot perform positioning. The positional information obtained by the own MCU 132 is the positional information obtained by adding the distance and angles (elevation angle and azimuth angle) calculated by the distance measurer 132A and the angle measurer 132B of the own MCU 132 to the positional information obtained by the own drone 100 from another drone 100 communicable by the BLE. The positional information [B] to [D] are the positional information obtained by the drones 100B to 100D in the same manner as the positional information of the drone 100A described above.

When the own GNSS module 120 cannot perform positioning, the drones 100A to 100D can obtain the positional information by adding the distance and angles (elevation angle and azimuth angle) calculated by the distance measurer 132A and the angle measurer 132B of the own MCU 132 to the positional information obtained by another drone 100.

In FIG. 3, a time axis extends in a vertical direction, and time elapses in a direction from the top to the bottom of the time axis. In FIG. 3, periods n−1, n, and n+1 are illustrated. The lengths of the periods n−1, n, and n+1 are equal to each other, and are, for example, 1 second or less.

In the period n−1, the drone 100A transmits positional information [A] in an advertisement packet as illustrated in (1), and the drone 100B receives the positional information [A] as illustrated in (2).

In the period n, the drone 100B transmits positional information [A]+[B] in an advertisement packet as illustrated in (3), and the drones 100A and 100C receive the positional information [A]+[B] as illustrated in (4). That is, the drone 100B adds the positional information [B] obtained by the own GNSS module 120 or MCU 132 to the positional information [A] received from the drone 100A and transmits the positional information [A]+[B] in an advertisement packet, and the drones 100A and 100C receive the positional information [A]+[B].

In the period n+1, the drone 100C transmits positional information [A]+[B]+[C] in an advertisement packet as illustrated in (5), and the drones 100B and 100D receive positional information [A]+[B]+[C] as illustrated in (6). That is, the drone 100C adds the positional information [C] obtained by the own GNSS module 120 or MCU 132 to the positional information [A]+[B] received from the drone 100B and transmits the positional information [A]+[B]+[C] in an advertisement packet, and the drones 100B and 100D receive the positional information [A]+[B]+[C].

By repeating such processing, the drones 100 whose communicable ranges 105 do not overlap with each other, such as the drones 100A and 100C, the drones 100A and 100D, and the drones 100B and 100D, can obtain each other's positional information in a chain. Also, the drones 100 whose communicable ranges 105 do not overlap with each other can share each other's positional information.

Therefore, like the drones 100A and 100C as illustrated in FIG. 1, even when they cannot communicate directly with each other by the BLE, they can share their positional information. In addition, the smartphone 200 can obtain the positional information of the drones 100A to 100C. Each positional information is transmitted between the drones 100 together with an ID of the drone that obtained the positional information in a state being included in the RID signal.

In addition, the drones 100A to 100D can obtain the positional information even when their own GNSS module 120 cannot perform positioning, by the distance measurer 132A and the angle measurer 132B performing the distance measurement and angle measurement. That is, even when the own GNSS module 120 is not capable of performing the positioning, the latest positional information of itself can be obtained. Therefore, when the own GNSS module 120 is not capable of performing the positioning, collision between the drones 100A to 100D can be further readily avoided than when the positional information cannot be obtained.

A method of sharing the positional information in each of the plurality of drones 100A to 100D between the drones, as illustrated in FIG. 3, is summarized as follows.

The controller 110 of each drone 100 transmits from the communicator 131 its own ID and positional information obtained by the own GNSS module 120 or positional information obtained by the distance measurer 132A and the angle measurer 132B and expressed by the distance and the angles. The RID signal including the positional information and the ID is transmitted from each drone 100, and is received by other drones 100 whose communicable range 105 overlaps.

The controller 110 in each drone 100 transmits from the communicator 131, the positional information of the other drones 100 received from the other drones 100 by its own communicator 131.

In addition, the controller 110 in each drone 100 transmits its own ID and the positional information measured by the own GNSS module 120, or the positional information obtained by the distance measurer 132A and the angle measurer 132B indicating the distance and the angles, together with the ID and positional information of the other drones 100, from the communicator 131.

<Timing of Transmission/Reception of Each Signal>

Figure 4A:
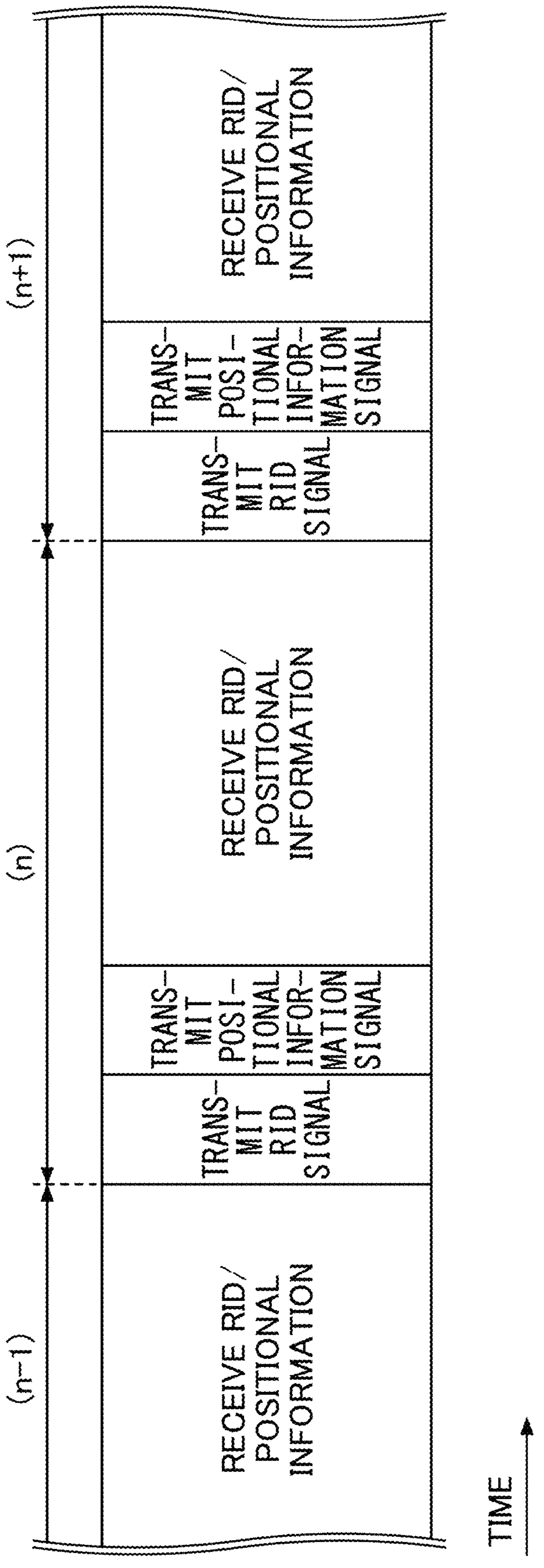
FIG. 4A is a diagram illustrating an example of timing of transmitting and receiving each signal in an advertisement packet.

FIG. 4A is a diagram illustrating an example of timing of transmitting and receiving each signal in an advertisement packet. In FIG. 4A, an advertisement packet of one frame in the period n is illustrated. As an example, as illustrated in the period n, transmission and reception may be performed in three stages: first, a RID signal including a remote ID of the drone 100 is transmitted; second, a positional information signal including positional information is transmitted; and third, the RID signal and the positional information signal are received. As an example, a transmission period of the RID signal and the transmission period of the positional information signal may be shorter than a reception period of the RID signal and positional information signal. The positional information obtained by the drone 100 may be transmitted by the RID signal.

<Data Structure of Advertisement Packet>

Figure 4B:
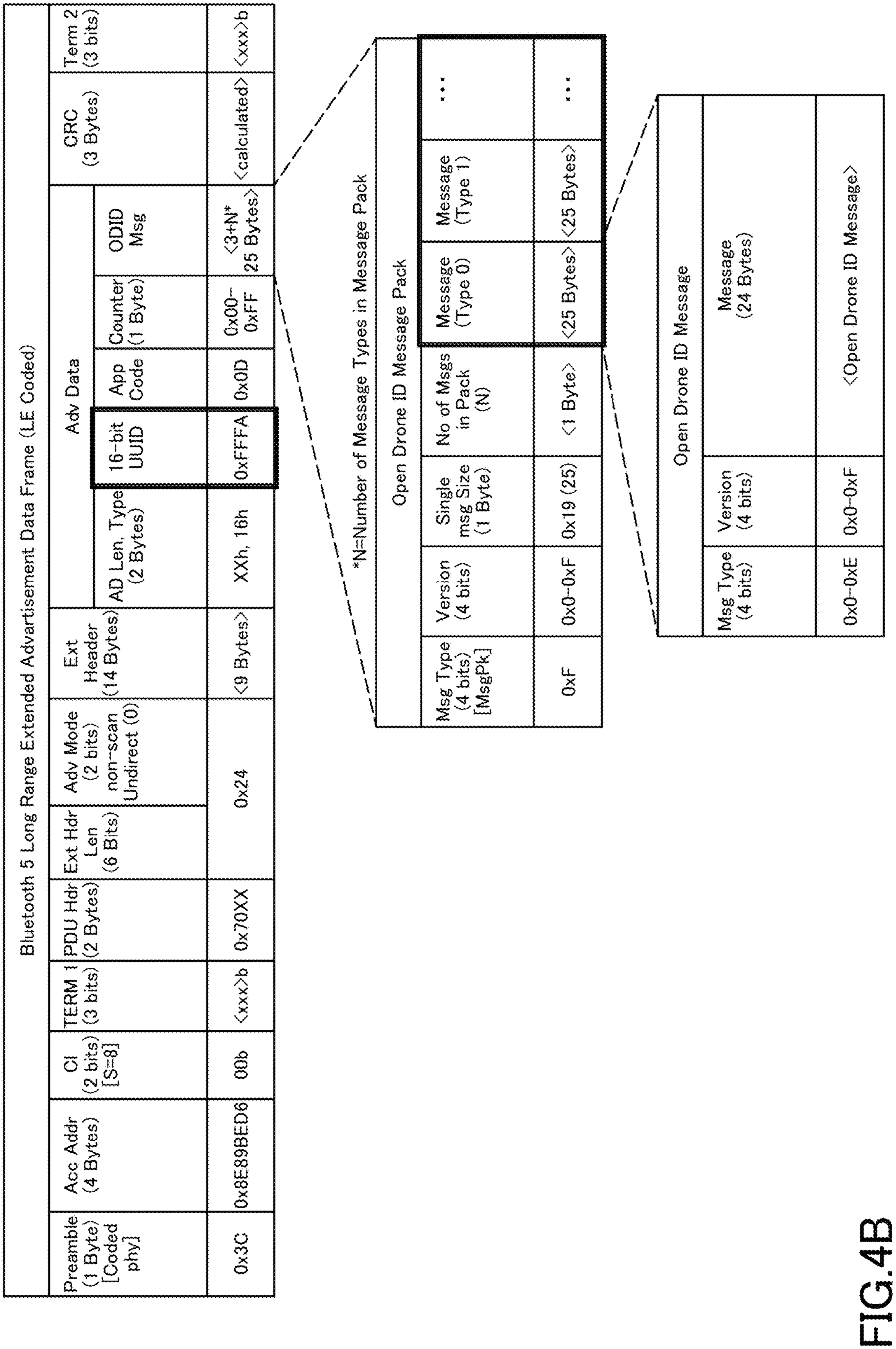
FIG. 4B is a diagram illustrating an example of a data structure of the advertisement packet.

FIG. 4B is a diagram illustrating an example of a data structure of an advertisement packet. As illustrated in FIG. 4B, the positional information can be stored in a message (type 0) of an ODID message (ODID Msg) of the advertisement data (Adv Data) of the advertisement packet, and the advertisement packet can be transmitted. Thus, as illustrated in FIG. 3, the positional information can be shared among the plurality of drones 100 whose communicable ranges 105 do not overlap with each other. In addition, the smartphone 200 which does not exist within the communicable ranges 105 can obtain the positional information of the drone 100.

<Processing Between Drones 100>

Figure 5:
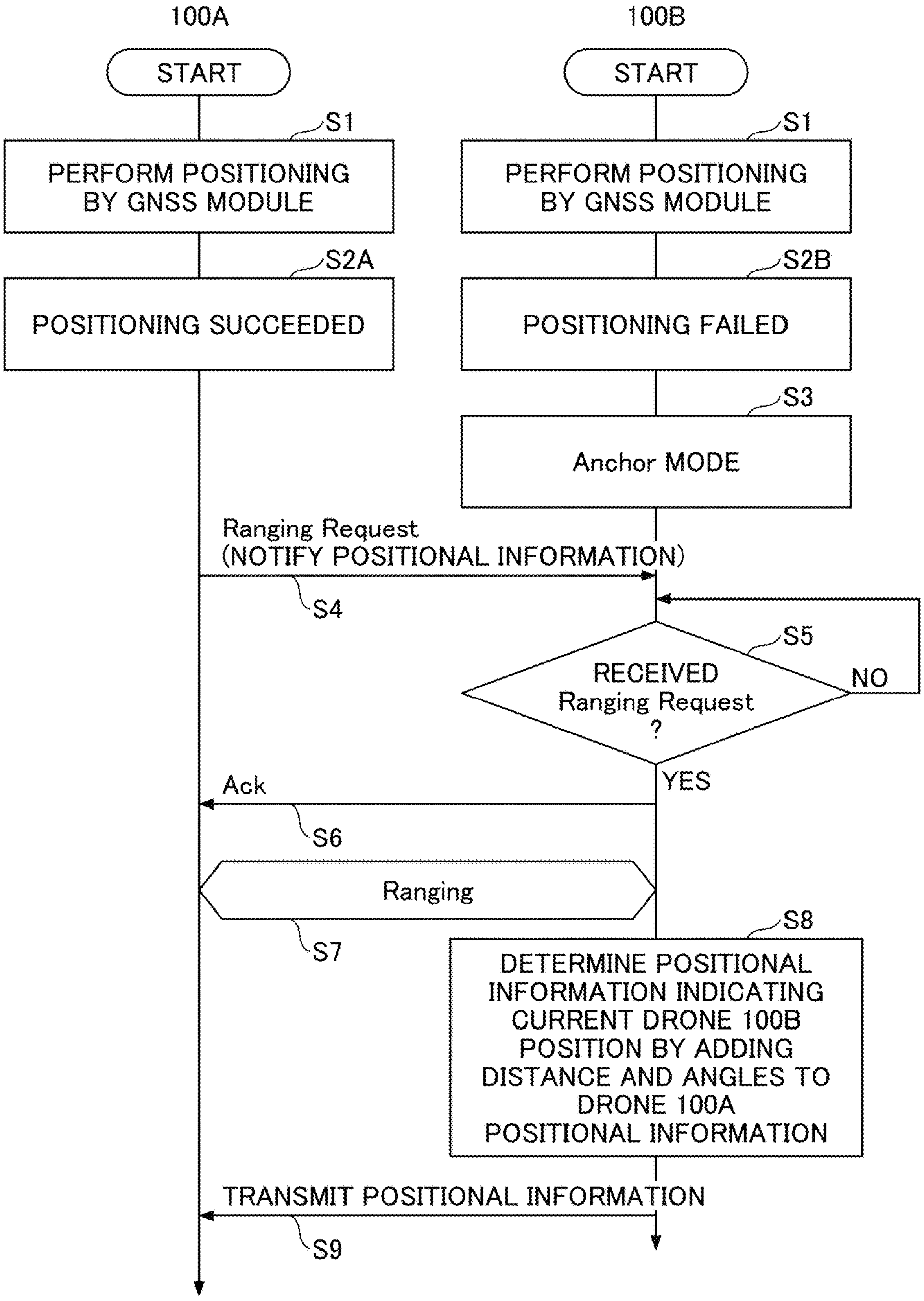
FIG. 5 is a flowchart illustrating an example of processing between two drones.

FIG. 5 is a flowchart illustrating an example of processing between the drones 100A and 100B. Here, the drones 100A and 100B are used as an example of two drones 100 capable of performing the BLE communication. Any two drones 100 capable of performing the BLE communication perform the processing in the same way.

When the drones 100A and 100B start the processing, they perform positioning by the GNSS module 120 (step S1).

Here, as an example, it is assumed that the GNSS module 120 of the drone 100A succeeded in positioning (step S2A) and the GNSS module 120 of the drone 100B failed in positioning (step S2B).

The controller 110 of the drone 100B that has failed in positioning switches its mode to an anchor mode (step S3).

The distance measurer 132A of the MCU 132 of the drone 100A that succeeded in the positioning transmits a ranging request (step S4). In addition to the transmission of the ranging request, in step S4, the distance measurer 132A of the drone 100A notifies the drone 100B of the positional information that has been obtained. Ranging is processing of round-trip signals between the drones 100A and 100B for distance measurement and angle measurement.

The controller 110 of the drone 100B determines whether or not the ranging request has been received (step S5). When the controller 110 of the drone 100B determines that the ranging request has not been received (NO in step S5), it repeatedly executes the processing of step S5 until the ranging request is received.

When the controller 110 of the drone 100B determines that the ranging request has been received (YES in step S5), it transmits an Ack (step S6). The Ack is an acknowledgement to notify the drone 100A that the ranging request has been received, and is an example of a response signal. Upon receiving the Ack, the controller 110 of the drone 100A prepares to perform ranging with the drone 100B.

Here, as an example, a configuration will be described in which the drone 100A that has succeeded in positioning transmits the ranging request, and the drone 100B that has failed in positioning transmits the Ack to the drone 100A to perform ranging. However, a reverse operation may be possible. The drone 100B that has failed in positioning may transmit the ranging request, the drone 100A that has succeeded in positioning may transmit the Ack, and the drones 100A and 100B may perform the ranging.

The drones 100A and 100B perform the ranging (step S7). The distance measurer 132A of the drone 100B, which measures the distance, transmits signals of the plurality of frequencies f1 to fN (N is an integer of 2 or greater) by using the communicator 131 of the drone 100B to the communicator 131 of the drone 100A via the antenna 130A. In contrast to this, the communicator 131 of the drone 100A transmits signals of the plurality of frequencies f1 to fN (N is an integer of 2 or greater) to the communicator 131 of the drone 100B.

The communicator 131 of the drone 100B receives the signals of the plurality of frequencies f1 to fN from the drone 100A via the antenna 130A. The distance measurer 132A of the drone 100B obtains data indicating the phase when the drone 100A receives the signals of each frequency, from the drone 100A by communication.

The distance measurer 132A and the angle measurer 132B of the drone 100B calculate the distance between the drones 100A and 100B and the angles (elevation angle and azimuth angle) of the drone 100B relative to the drone 100A, and add them to the positional information of the drone 100A notified in step S4 to determine positional information indicating the current position of the drone 100B (step S8). Specifics are described below. The obtained positional information is notified to the controller 110.

The distance measurer 132A of the drone 100B determines the total phase (round-trip phase) for each frequency between the phase when the antenna 130A receives the signal of each frequency from the drone 100A and the phase when the drone 100A receives the signal of each frequency. The distance measurer 132A of the drone 100B measures the distance between the antenna 130A of the drone 100B and the drone 100A from the relationship between the plurality of frequencies and the round-trip phase at each frequency.

The angle measurer 132B of the drone 100B measures the elevation angle and the azimuth angle in the AOA format based on the phase differences when the three antennas 130A receive the signal transmitted from the drone 100A, when the drones 100A and 100B perform the ranging.

The controller 110 of the drone 100B transmits the positional information of the drone 100B obtained in step S8 to the drone 100A (step S9).

As described above, even when the drone 100B fails to perform the positioning between the drones 100A and 100B, the drone 100B can obtain its own positional information and can notify the drone 100A of the obtained positional information.

When the drone 100B succeeds in the positioning and the drone 100A fails in the positioning, the operation of the drones 100A and 100B is the same as that described above except that the operation is reversed. When both the drones 100A and 100B succeed in the positioning, they send each other a ranging request to notify each other of the positional information obtained by respective positioning. When both the drones 100A and 100B fail in the positioning, other drones such as the drones 100C and 100D perform the distance measurement and calculation of their positions.

By performing such operation between the two drones 100 whose communicable ranges 105 overlap, the drones 100A to 100D can share each other's positional information as illustrated in FIG. 3. Also, as illustrated in FIG. 3, in a state where the smartphone 200 can perform the BLE communication only with the drone 100A among the drones 100A to 100D, the smartphone 200 can obtain the positional information of all the drones 100A to 100D.

Figure 6:
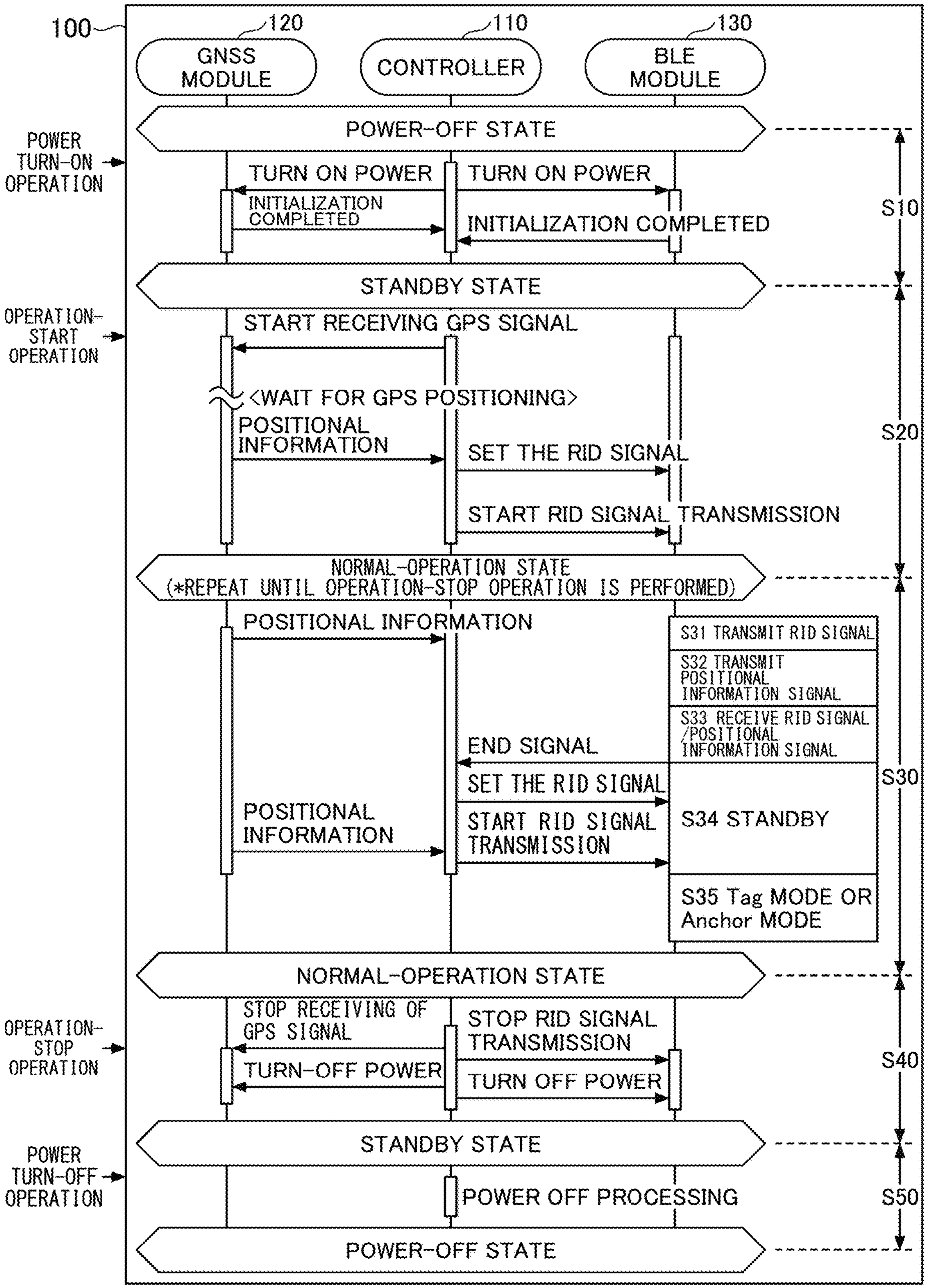
FIG. 6 is a task diagram illustrating an example of processing performed by a controller, a global navigation satellite system (GNSS) module, and a Bluetooth Low Energy (BLE) module of the drone.

FIG. 6 is a task diagram illustrating an example of the processing performed by the controller 110, the GNSS module 120, and the BLE module 130 of the drone 100.

<Step S10>

In step S10, the power of the drone 100 is turned on by the user while the power of the controller 110, the GNSS module 120, and the BLE module 130 is off. The controller 110 turns on the power of the GNSS module 120 and the BLE module 130, and the GNSS module 120 and the BLE module 130 notify the controller 110 of the completion of initialization. After this, the controller 110, the GNSS module 120, and the BLE module 130 enter a standby state.

<Step S20>

In the standby state, when the operation-start operation is performed by the user through the remote controller of the drone 100, the controller 110 causes the GNSS module 120 to start receiving the GPS signal and waits for the completion of positioning (waits for GPS positioning). When the positioning is successful, the GNSS module 120 notifies the controller 110 of the positional information. The positional information represents the position of the drone 100 by the longitude and the latitude.

The controller 110 notifies the BLE module 130 of the positional information to set a RID signal in order to perform initial setting of parameters, etc., and notifies a command to start transmission of the RID signal in order to start RID signal transmission. The RID signal is a signal including positional information, and is stored in an advertisement packet and transmitted from the BLE module 130.

<Step S30>

Step S30 is a normal-operation state in which the controller 110, the GNSS module 120, and the BLE module 130 can perform a normal operation. The normal operation is a state in which the GNSS module 120 can perform positioning and the BLE module 130 can transmit positional information to other drones 100.

The BLE module 130 stores the RID signal in an advertisement packet and transmits (step S31) the RID signal to the other drones 100.

The BLE module 130 stores the positional information signal in the advertisement packet and transmits (step S32) the positional information signal to the other drones 100. Note that when the positional information signal is transmitted for the first time, there is no positional information, such that the positional information signal does not include positional information.

The BLE module 130 receives the RID signal and the positional information signal from the other drone 100 whose communicable range 105 overlaps (step S33). When the BLE module 130 receives the RID signal and the positional information signal, it notifies the controller 110 of an end signal.

Thus, while the BLE module 130 is performing the processing of steps S31 to S33, the GNSS module 120 repeatedly performs positioning, and the controller 110 obtains positional information from the GNSS module 120.

The BLE module 130 is in a standby mode until the setting of the RID signal is performed and the command to start transmission of the RID signal is notified (step S34). The BLE module 130 obtains positional information from the controller 110 in conjunction with the setting of the RID signal performed by the controller 110.

When the setting of the RID signal is performed and the command to start transmission of the RID signal is notified, the BLE module 130 performs processing of the tag mode or anchor mode (step S35).

Since the above-described step S30 (steps S31 to S35) is the processing performed in the normal-operation state in which the controller 110, the GNSS module 120, and the BLE module 130 are allowed to perform the normal operation, step S30 is repeatedly executed until step S40 (operation-stop processing) described in the following is performed.

<Step S40>

Step S40 is the processing for operation stop. The controller 110 starts the processing when operation for the operation stop is performed by the user.

The controller 110 sends a command to the GNSS module 120 to stop receiving of the GPS signal and sends a command to the BLE module 130 to stop transmission of the RID signal. Next, the controller 110 turns off the power of the GNSS module 120 and the BLE module 130.

<Step S50>

The controller 110 finishes the processing in step S40 and enters the standby state. When the user performs the operation to turn off the power of the drone 100, the controller 110 starts the processing in step S50 to turn off its own power. As a result, the controller 110, the GNSS module 120, and the BLE module 130 are turned off.

Figure 7:
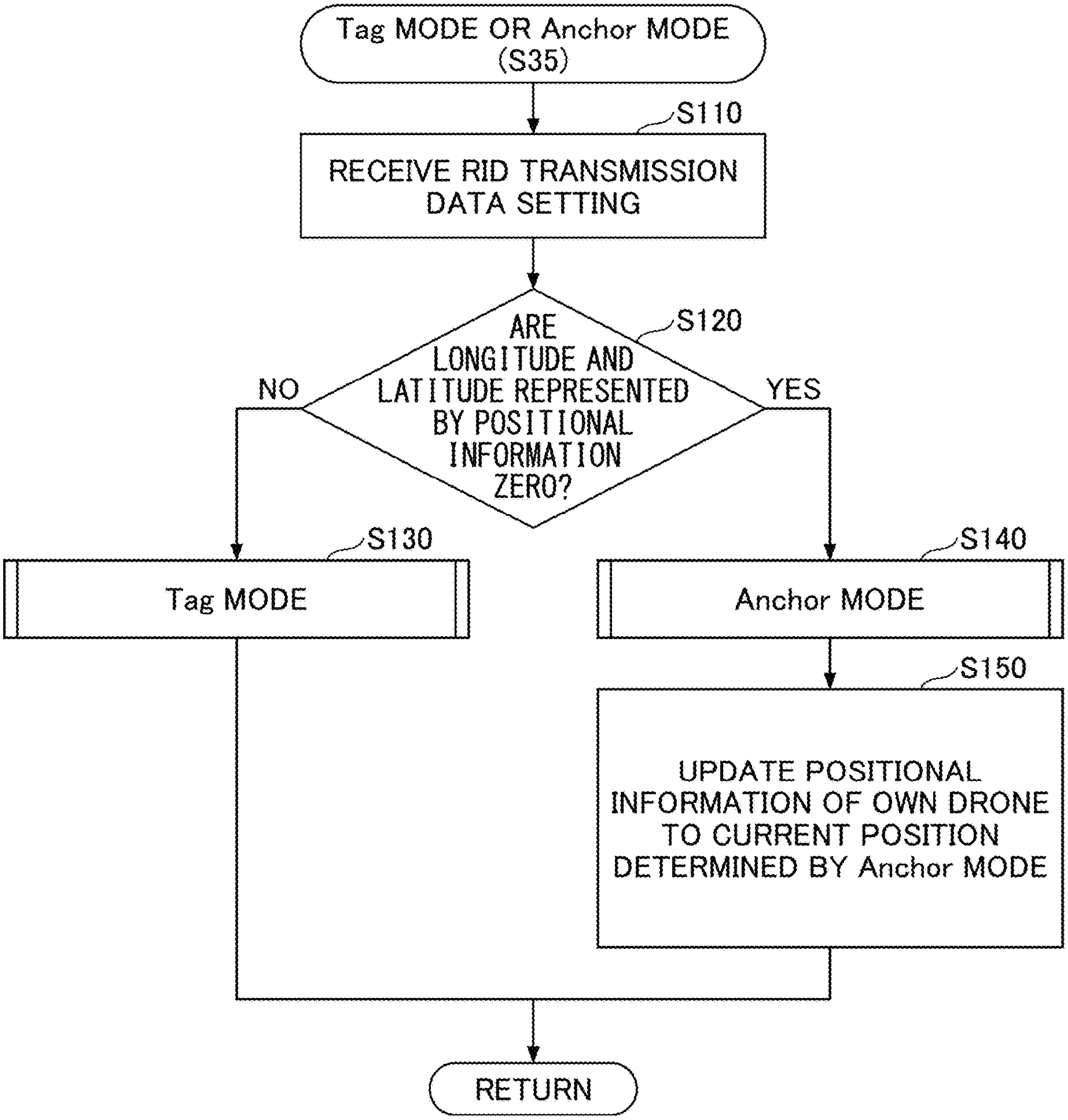
FIG. 7 is a flowchart illustrating an example of detailed processing performed in a tag mode or an anchor mode.

FIG. 7 is a flowchart showing an example of the detailed processing in Step S35. The processing in FIG. 7 is executed by the MCU 132 of the BLE module 130.

The distance measurer 132A receives the setting of the RID signal (step S110). The controller 110 notifies the MCU 132 of the BLE module 130 of the positional information.

The distance measurer 132A determines whether or not the longitude and the latitude represented by the positional information are not zero (step S120).

When the distance measurer 132A determines that the longitude and the latitude represented by the positional information are not zero (NO in step S120), it starts tag mode processing (step S130). The tag mode processing is subroutine processing and will be described in the following with reference to FIG. 8A.

When the distance measurer 132A finishes the tag mode processing (step S130), it finishes the processing of step S35 illustrated in FIG. 6.

When the distance measurer 132A determines that the longitude and the latitude represented by the positional information are zero (YES in step S120), it starts anchor mode processing (step S140). The anchor mode processing is performed by the distance measurer 132A and the angle measurer 132B. The anchor mode processing is a subroutine processing and will be described in the following with reference to FIG. 8B.

When the anchor mode processing (step S140) is completed, the distance measurer 132A updates the positional information of its own drone 100 to the positional information representing its current position obtained in the anchor mode processing (step S150).

<Tag Mode Processing>

Figure 8A:
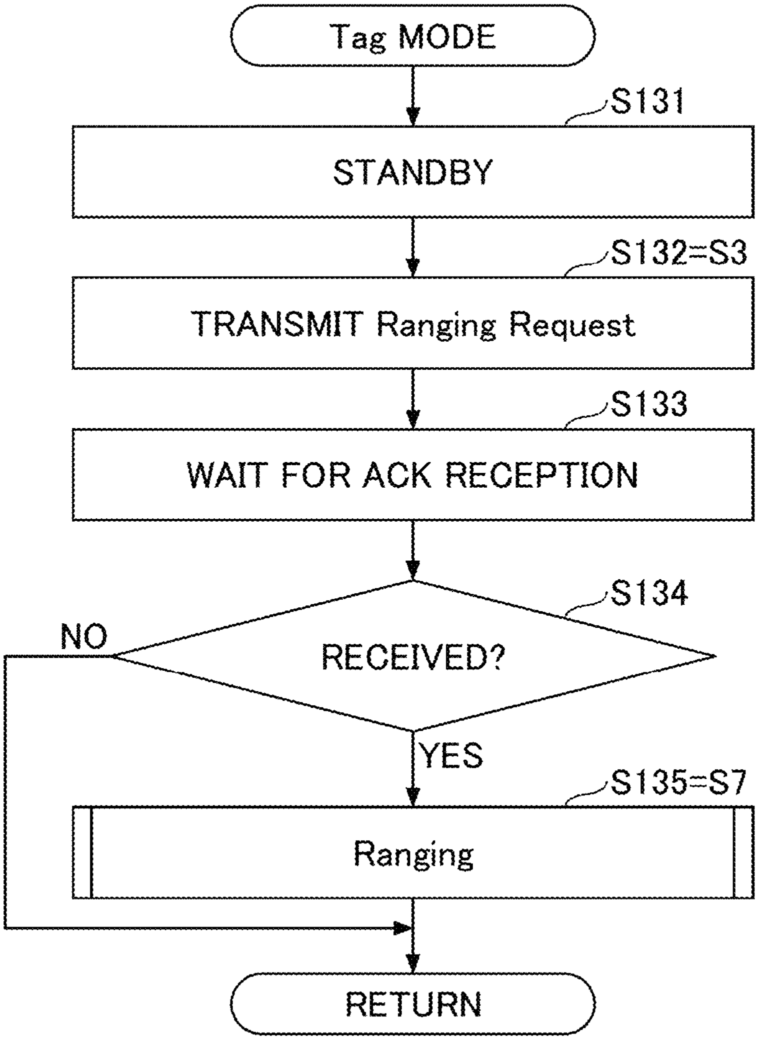
FIG. 8A is a flowchart illustrating an example of tag mode processing.

FIG. 8A is a flowchart illustrating an example of tag mode processing.

When the distance measurer 132A starts the tag mode processing, it enters the standby mode (step S131).

The distance measurer 132A transmits a ranging request (step S132). The processing in step S132 corresponds to step S4 in FIG. 5.

The distance measurer 132A waits for the reception of an Ack (step S133).

The distance measurer 132A determines whether or not an Ack has been received (step S134).

When the distance measurer 132A determines that an Ack has been received (YES in step S134), it performs ranging (step S135). The processing of step S135 corresponds to step S7 in FIG. 5 performed by the drone 100A. When the distance measurer 132A finishes the ranging, it returns to step S131 of the flow.

When it is determined in step S134 that an Ack has not been received (NO in step S134), the distance measurer 132A skips step S135 and returns to step S131 of the flow.

<Anchor Mode Processing>

Figure 8B:
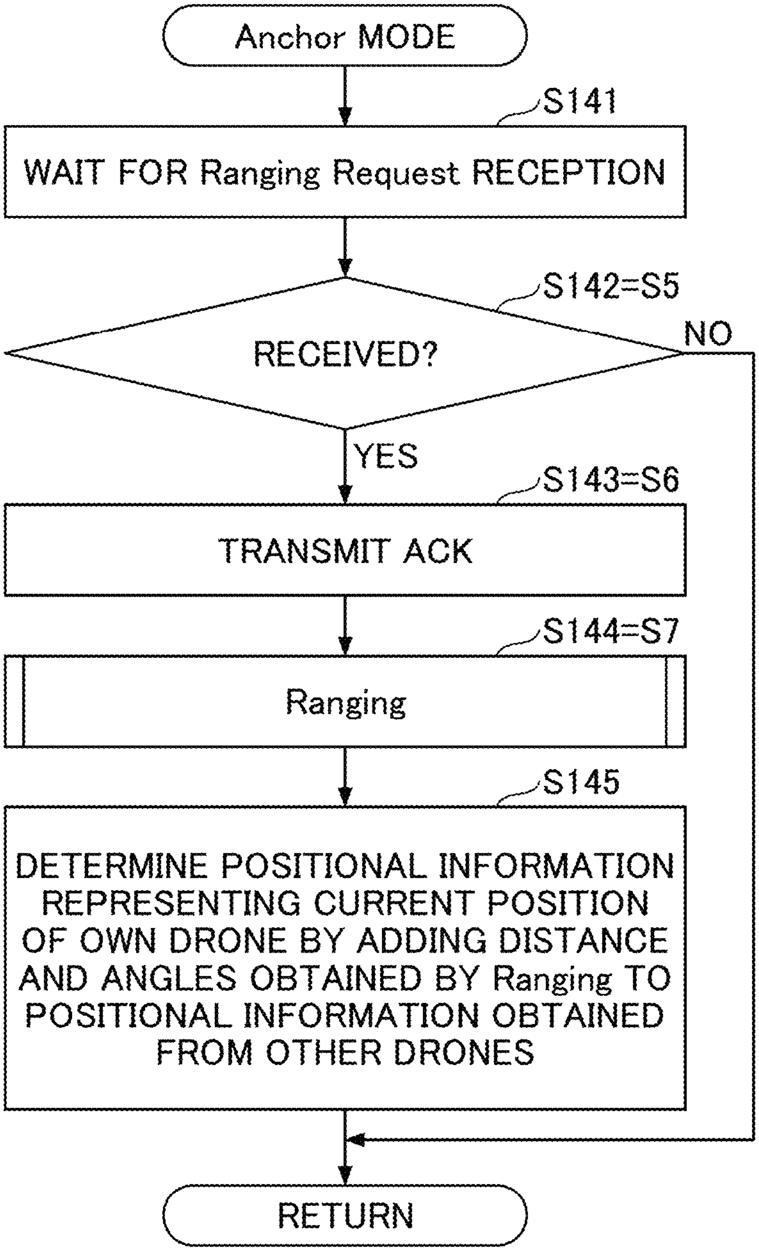
FIG. 8B is a flowchart illustrating an example of anchor mode processing.

FIG. 8B is a flowchart illustrating an example of anchor mode processing.

When the distance measurer 132A starts the anchor mode processing, it waits for the reception of a ranging request (step S141).

The distance measurer 132A determines whether or not the ranging request has been received (step S142). The processing in step S142 corresponds to step S5 in FIG. 5.

When it is determined that the ranging request has been received (YES in step S142), the distance measurer 132A transmits an Ack (step S143). The processing of step S143 corresponds to step S6 in FIG. 5.

The distance measurer 132A performs ranging (step S144). The processing of step S144 corresponds to step S7 in FIG. 5 performed by the drone 100B.

After finishing the ranging, the distance measurer 132A adds the distance and the angles obtained in the ranging to the positional information obtained from the other drones 100 to determine positional information representing the current position of itself (step S145). When the distance measurer 132A finishes the processing of step S145, it returns to step S141 of the flow.

When the distance measurer 132A determines in step S142 that the ranging request has not been received (NO in step S142), it skips the processing of steps S143, S144, and S145 and returns to step S141 of the flow.

It should be noted that, although a configuration in which the distance measurer 132A mainly executes the processing as illustrated in FIGS. 7, 8A, and 8B has been described above, the MCU 132 may include a main controller which mainly executes the processing as illustrated in FIGS. 7, 8A, and 8B separately from the distance measurer 132A and the angle measurer 132B. In this case, the distance measurer 132A may perform the ranging in step S135, the ranging in step S144, and the distance measurement processing in step S145.

Advantageous Effect

The positioning system 10 includes the plurality of drones 100 (mobile bodies) and is configured to measure positions of the plurality of drones 100. Each drone 100 includes the GNSS module 120 (positioner) configured to perform positioning based on a GPS signal (positioning signal) transmitted from a positioning satellite; the distance measurer 132A configured to measure the distance relative to another drone 100 based on the propagation time or phase of a signal communicated between the own communicator 131 configured to perform wireless communication and the communicator 131 of another drone 100; and the angle measurer 132B configured to calculate angles of its own drone 100 relative to the other drone 100 based on the phase of the signal communicated with the communicator 131 of the other drone 100. Each drone 100 further includes the plurality of antennas 130A shared by the communicator 131, the distance measurer 132A, and the angle measurer 132B; and the controller 110 configured to control the GNSS module 120, the communicator 131, the distance measurer 132A, and the angle measurer 132B. Upon the GNSS module 120 being unable to receive a GPS signal and a ranging request (request signal) being received by the communicator 131 from the other drone 100, the controller 110 transmits an Ack (response signal) by using the communicator 131 to the other drone 100, the distance measurer 132A measures the distance, and the angle measurer 132B calculates the angles. Additionally, upon the GNSS module 120 being unable to receive the GPS signal and an Ack (response signal) being received by the communicator 131 from the other drone 100 in response to the distance measurer 132A sending a ranging request (request signal) by using the communicator 131 to the other drone 100, the distance measurer 132A measures the distance and the angle measurer 132B calculates the angles. Therefore, the drone 100 which cannot obtain the GPS signal from the GPS satellite can determine the distance and angles relative to the other drone 100.

Therefore, the positioning system 10 configured to obtain the positional information of the drone 100 (mobile body) which cannot obtain the GPS signal (positioning signal) from the GPS satellite (positioning satellite) is provided.

The controller 110 of each drone 100 transmits, from the communicator 131, its own identifier and positional information obtained by positioning performed by the own GNSS module 120 or positional information indicated by distance and angles obtained by the distance measurer 132A and the angle measurer 132B. Therefore, each drone 100 can share each other's positional information in a state distinguishable by its identifier in both cases where each drone 100 can obtain the GPS signal and where either drone 100 cannot obtain the GPS signal.

The controller 110 of each drone 100 transmits, from the communicator 131, the positional information of the other drone 100 received from the other drone 100 by its own communicator 131. Therefore, each drone 100 can obtain positional information of the other drone 100.

Furthermore, the controller 110 of each drone 100 transmits, by using the communicator 131, its own identifier and the positional information obtained by positioning performed by the own GNSS module 120 or the positional information indicated by the distance and angles obtained by the distance measurer 132A and the angle measurer 132B, together with the identifier and the positional information of the other drone 100. Therefore, each drone 100 can obtain the positional information of each drone 100 in a chain and in a state distinguishable by the identifier, including the positional information of other drones 100 whose communicable range 105 does not overlap with its own communicable range 105. Such obtainment of positional information is possible in both cases where each drone 100 can obtain the GPS signal and the case where any of the drones 100 cannot obtain the GPS signal. Furthermore, a terminal or the like such as the smartphone 200 capable of communicating with any one of the drones 100 can obtain the positional information of all the drones 100.

The communicator 131 transmits and receives Bluetooth Low Energy (registered trademark) beacon signals. The distance measurer 132A measures the distance by using a signal other than an advertisement packet transmitted and received by the communicator 131, and the angle measurer 132B calculates the angles by using the signal other than the advertisement packet transmitted and received by the communicator 131. Therefore, the distance is measured by using the signal that can be transmitted and received by the communicator 131 of the BLE module 130, and the angle measurer 132B calculates the angles by using the signal that can be transmitted and received by the communicator 131. By using the signal that can be transmitted and received by the communicator 131, the communication of positional information, the distance measurement, and the angle measurement can all be achieved.

The drone 100 is remotely operated by wireless communication. Since the drone 100 is remotely operated by a user by a remote controller or the like by wireless communication, the importance of positional information is very high, unlike a vehicle or the like that is driven by the user. Since the GNSS module 120 may fail in positioning, in such a case, the positioning system 10, which can determine the positional relationship with other drones 100 by distance measurement and angle measurement, is very useful.

In the above description, an embodiment in which the GNSS module 120 obtains the positional information has been described. However, the GNSS module 120 may receive a GPS signal, and the controller 110 may obtain positional information based on the GPS signal.

In addition, the embodiment in which the BLE module 130 performs distance measurement and angle measurement has been described above. However, the BLE module 130 may transmit and receive signals for the distance measurement and the angle measurement, and the controller 110 may perform the distance measurement and the angle calculation (elevation angle and azimuth angle).

Provided is a positioning system capable of obtaining positional information of a mobile body which cannot obtain a positioning signal from the positioning satellite.

The positioning system according to an exemplary embodiment of the present disclosure has been described above, but the present disclosure is not limited to the specifically disclosed embodiment, and various modifications and changes may be made without departing from the scope of the claims.

What is claimed is:

1. A positioning system provided with a plurality of mobile bodies, for measuring positions of the plurality of mobile bodies, wherein each mobile body includes a positioner configured to perform positioning based on a positioning signal transmitted from a positioning satellite;

a communicator configured to perform wireless communication;

a distance measurer configured to measure a distance relative to another mobile body based on a propagation time or phase of a signal communicated with the communicator of the another mobile body;

an angle measurer configured to calculate an angle of the mobile body of its own relative to the another mobile body based on the phase of the signal communicated with the communicator of the another mobile body;

a plurality of antennas shared by the communicator, the distance measurer, and the angle measurer; and a controller configured to control the positioner, the communicator, the distance measurer, and the angle measurer, wherein the controller of the mobile body in which the positioner is unable to receive the positioning signal switches a mode to a first mode for transmitting a request signal, the controller of the mobile body in which the positioner has received the positioning signal switches the mode to a second mode to wait for reception of the request signal from the another mobile body which is unable to receive the positioning signal, and when the positioner is unable to receive the positioning signal, the distance measurer transmits the request signal by using the communicator, the distance measurer measures the distance and the angle measurer calculates the angle, upon receiving a response signal from the another mobile body in which the communicator has received the positioning signal, and positional information is obtained by adding the distance and the angle to the positional information indicated by the positioning signal received via the communicator from the mobile body which has received the positioning signal.

2. The positioning system according to claim 1, wherein the plurality of mobile bodies include N number of mobile bodies (N is an integer of 3 or greater), the controller in the each mobile body transmits, from the communicator, an own identifier and the positional information obtained by positioning performed by the positioner of its own, or the positional information obtained by adding the distance and the angle to the positional information indicated by the positioning signal received via the communicator from the mobile body which has received the positioning signal, and the controller in the each mobile body transmits, from the communicator, the positional information of the another mobile body received from the another mobile body by the communicator.

3. The positioning system according to claim 2, wherein the communicator is configured to transmit and receive an advertisement packet of Bluetooth Low Energy (registered trademark), the distance measurer measures the distance relative to the another mobile body based on the propagation time or phase used in transmission of a modulation signal, which has a frequency equivalent to that of the advertisement packet transmitted and received by the communicator, with the communicator of the another mobile body, and the angle measurer calculates an angle of the mobile body of its own relative to the another mobile body, based on the phase used in communication of the modulation signal, transmitted and received by the communicator, with the communicator of the another mobile body.

4. The positioning system according to claim 3, wherein the controller in the each mobile body transmits, from the communicator, the own identifier, and the positional information obtained by the positioning performed by the positioner of its own or the positional information indicated by the distance and the angle obtained by the distance measurer and the angle measurer, together with the identifier and the positional information of the another mobile body.

5. The positioning system according to claim 3, wherein the mobile body is remotely operated by wireless communication.

6. A positioning system provided with a plurality of mobile bodies, for measuring positions of the plurality of mobile bodies, wherein each mobile body includes a positioner configured to perform positioning based on a positioning signal transmitted from a positioning satellite;

a communicator configured to perform wireless communication;

a distance measurer configured to measure a distance relative to another mobile body based on a propagation time or phase of a signal communicated with the communicator of the another mobile body;

an angle measurer configured to calculate an angle of the mobile body of its own relative to the another mobile body based on the phase of the signal communicated with the communicator of the another mobile body;

a plurality of antennas shared by the communicator, the distance measurer, and the angle measurer; and a controller configured to control the positioner, the communicator, the distance measurer, and the angle measurer, wherein the controller of the mobile body in which the positioner has received the positioning signal switches a mode to a first mode for transmitting a request signal, the controller of the mobile body in which the positioner is unable to receive the positioning signal switches the mode to a second mode to wait for reception of the request signal from the another mobile body which has received the positioning signal, and when the positioner is unable to receive the positioning signal, upon receiving the request signal by the communicator, the controller transmits a response signal by using the communicator to the another mobile body, the distance measurer measures the distance, the angle measurer calculates the angle, and positional information is obtained by adding the distance and the angle to the positional information indicated by the positioning signal received via the communicator from the mobile body which has received the positioning signal.

7. The positioning system according to claim 6, wherein the plurality of mobile bodies include N number of mobile bodies (N is an integer of 3 or greater), the controller in the each mobile body transmits, from the communicator, an own identifier and the positional information obtained by positioning performed by the positioner of its own, or the positional information obtained by adding the distance and the angle to the positional information indicated by the positioning signal received via the communicator from the mobile body which has received the positioning signal, and the controller in the each mobile body transmits, from the communicator, the positional information of the another mobile body received from the another mobile body by the communicator.

8. The positioning system according to claim 7, wherein the communicator is configured to transmit and receive an advertisement packet of Bluetooth Low Energy (registered trademark), the distance measurer measures the distance relative to the another mobile body based on the propagation time or phase used in transmission of a modulation signal, which has a frequency equivalent to that of the advertisement packet transmitted and received by the communicator, with the communicator of the another mobile body, and the angle measurer calculates an angle of the mobile body of its own relative to the another mobile body, based on the phase used in communication of the modulation signal, transmitted and received by the communicator, with the communicator of the another mobile body.

9. The positioning system according to claim 8, wherein the controller in the each mobile body transmits, from the communicator, the own identifier, and the positional information obtained by the positioning performed by the positioner of its own or the positional information indicated by the distance and the angle obtained by the distance measurer and the angle measurer, together with the identifier and the positional information of the another mobile body.

10. The positioning system according to claim 8, wherein the mobile body is remotely operated by wireless communication.

* * * * *